United States Patent [19]
Beregi et al.

[11] 3,886,195
[45] May 27, 1975

[54] 1-TRIFLUOROMETHYLPHENYL-2-CYANOALKYLAMINE PROPANE

[75] Inventors: Laszlo Beregi, Boulogne, Seine; Pierre Hugon, Rueil-Malmaison; Jacques Duhault, Chatou, all of France

[73] Assignee: Science-Union et cie, Suresnes, France

[22] Filed: Jan. 17, 1973

[21] Appl. No.: 324,433

[30] Foreign Application Priority Data
Feb. 7, 1972 United Kingdom................. 5557/72

[52] U.S. Cl. ............................. 260/465 E; 424/304
[51] Int. Cl. ........................................... C07c 121/78
[58] Field of Search ................................ 260/465 E

[56] References Cited
FOREIGN PATENTS OR APPLICATIONS
1,112,987  8/1961  Germany OTHER PUBLICATIONS
Moed et al., Rec. Trav. Chim., 74, pp. 922–923 relied upon (1955).

*Primary Examiner*—Lewis Gotts
*Assistant Examiner*—Dolph H. Torrence
*Attorney, Agent, or Firm*—Gordon W. Hueschen

[57] ABSTRACT

Amino-propane compounds of the formula:

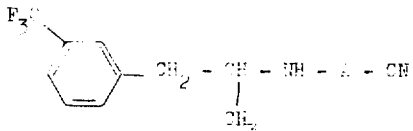

where A represents:

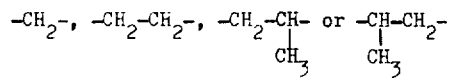

in racemic and optically active forms.

These compounds are used as medicines especially as appetite inhibitors.

5 Claims, No Drawings

1-TRIFLUOROMETHYLPHENYL-2-CYANOALKYLAMINE PROPANE

The present invention provides amino-propane compounds of the general formula I:

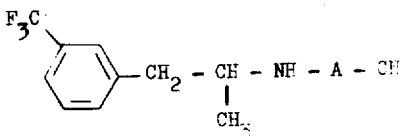

wherein A is selected from the group consisting of:

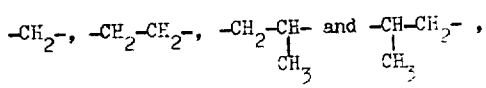

in racemic and optically active forms and acid addition salts, especially physiologically tolerable acid addition salts thereof.

As a matter of fact, the compounds of the general formula I contain at least one or, in the case when A represents

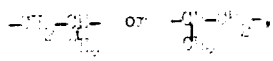

two asymetric carbon atoms and, therefore, they exist in optically active forms.

Furthermore, the compounds of the general formula I yield addition salts, with acids, especially with physiologically tolerable acids. As acids which may be used to form physiologically tolerable addition salts, there may be especially mentioned, for example, in the mineral series: hydrochloric, hydrobromic, sulfuric and phosphoric acids; and in the organic series: acetic, propionic, maleic, fumaric, tartaric, citric, oxalic, benzoic and methane sulfonic acids.

The compounds of the general formula I are new and they are prepared according to the following processes.

The compounds of the general formula I are prepared by refluxing the compound of the formula II:

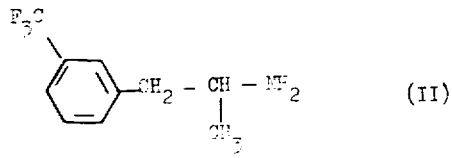

respectively; the latter three synthesis advantageously being carried out in the presence of a suitable catalyst for example hydrated cupric acetate.

The compounds are also prepared from a ketimine of the general formula III:

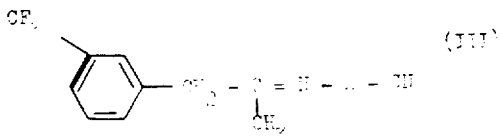

wherein A has the meaning given above, by mild reduction with a hydride, preferably with a complex metal hydride such as sodium borohydride or by sodium bis-(2-methoxyethoxy) aluminium hydride, or by catalytic reduction, preferably with a Raney nickel or platinum catalyst, and from a compound of the formula IV:

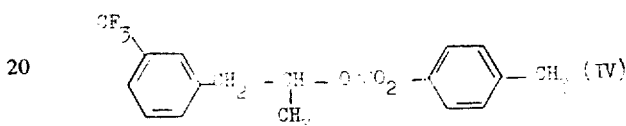

by reacting it with an appropriate amino nitrile.

Certain nitrile derivatives of amphetamine are known (cf. H. D. Moed et al., Rec. Trav. Chim. P.B. 74,919 (1955), and J. R. Bottu, French Patents 4364 M and 229 CAM), but such compounds, which are appetite inhibitors, have generally undesirable properties, for example, they cause CNS stimulation and hypertension and they are addictive (cf. J. Klosa, German Patent 1112987).

It has been found that the compounds of the general formula I, and physiologically tolerable acid addition salts thereof possess appetite inhibitor properties but, surprisingly, that they do not cause appreciable blood pressure changes or changes in the pulse rate. Additionally, the compounds of the invention are not addictive and do not exhibit CNS stimulation and they possess an increasing and regulating activity on lipid and glucide metabolisms.

The compounds of the general formula I and their physiologically tolerable acid addition salts may be used as medicines, especially as appetite inhibitor and lipid and glucide metabolism regulator, in admixture or conjunction with pharmaceutically acceptable carriers such, for example, as distilled water, glucose, lactose, starch, talc, magnesium stearate, ethyl cellulose or cocoa butter for oral, rectal or parenteral administration. The pharmaceutical forms may be tablets, dragees, capsules, suppositories, or injectable solutions. The dose may vary from 10 to 100 mg, 1 to 5 times a day.

The following examples illustrate the invention, the parts being by weight and the melting points being determined on a Kofler block.

EXAMPLE 1

1-m-trifluoromethylphenyl-2-cyanomethylamino propane

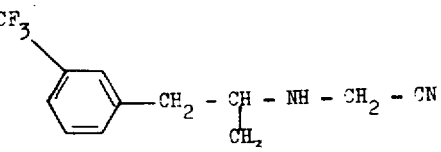

40.7 parts of glycolonitrile (as a 70 percent aqueous solution) were added to 100 parts of 1-m-trifluoromethylphenyl-2-amino propane with stirring. The temperature rose from 24° to 57° C in 10 minutes. The reaction mixture was subsequently heated on a steam-bath for 30 minutes and was then concentrated and distilled in vacuo. There were obtained 95 parts of 1-m-trifluoromethylphenyl-2-cyanomethyl-amino propane, B. Pt. 115°–116° C (0.6 mm). The corresponding hydrochloride, after one recrystallization from anhydrous isopropanol, melts at 149°–150°C.

The following compounds were prepared according to the process described in example 1.

a. 1 1-m-trifluoromethylphenyl-2-cyanomethylamino propane, M.P. of the corresponding methane sulfonate: 142° C, $[\alpha]_D^{25}$ : $-8° \pm 0,5°$ for a 20 percent aqueous solution of the corresponding methane sulfonate, starting from glycolonitrile and 1 1-m-trifluoromethylphenyl-2-amino propane.

b. d 1-m-trifluoromethylphenyl-2-cyanomethylamino propane, M.P. of the corresponding methane sulfonate: 141°–142° C, $[\alpha]_D^{25}$ : $+8,5° \pm 0,5°$ for a 20 percent aqueous solution of the corresponding methane sulfonate, starting from glycolonitrile and d 1-m-trifluoromethylphenyl-2-amino propane.

EXAMPLE 2

1-m-trifluoromethylphenyl-2-β-cyanoethylamino propane 2.4 parts of hydrated cupric acetate were added to a mixture of 61 parts of 1-m-trifluoromethylphenyl-2-amino propane and 16 parts of acrylonitrile and the reaction mixture was refluxed. The temperature of the reactants rose from 95° to 130° C in 15 minutes. After cooling, 100 parts of ether were added. The resulting solution was washed twice each time with 50 parts of water, and the organic phase was dried over anhydrous magnesium sulphate, and was then concentrated and distilled in vacuo.

There were obtained 47 parts of 1-m-trifluoromethylphenyl-2-β-cyanoethylamino propane, B. Pt. 120°–125° C (0.4 mm). The corresponding hydrochloride, after one recrystallization from ethyl acetate, melts at 140° C.

EXAMPLES 3 and 4

The following compounds were prepared according to the process described in example 2.

3. 1-m-trifluoromethylphenyl-2-β-cyanopropylamino propane, B. Pt. 125°–128° C (0.5 mm) starting from methacrylonitrile and 1-m-trifluoromethylphenyl-2-amino propane.

The corresponding hydrochloride melts at 163° C (isopropanol).

4. 1-m-trifluoromethylphenyl-2-(1-cyano-2-propyl amino) propane, M.P. of the corresponding hydrochloride: 138°–140° C, starting from 3-butenonitrile and 1-m-trifluoromethylphenyl-2-amino propane.

EXAMPLE 5

1-m-trifluoromethylphenyl-2-cyanomethylamino propane

To 300 parts of benzene were added 20.2 parts of m-trifluoromethylphenyl acetone and 5.6 parts of α-aminoacetonitrile. The mixture was heated to reflux employing a Dean-Stark water separator and refluxed until no more water separated. The reaction mixture was then concentrated and the crude ketimine isolated. This ketimine was dissolved in 300 parts of methanol and the solution was cooled in an ice bath. To this cooled solution were added 10.1 parts of sodium borohydride portionwise with stirring, and the reaction mixture was refluxed for 4 hours. The solution was concentrated and 200 parts of water were added.

The mixture was treated by 30 parts of 40 percent potassium hydroxide and 26 parts of KOH pellets and the resulting mixture was extracted twice with ether. The ether solutions were washed with water and dried over anhydrous magnesium sulfate. After filtration and distillation, there were obtained 9 parts of 1-m-trifluoromethylphenyl-2-cyanomethyl-amino propane, boiling at 114°–116° C under a pressure of 0.6 mm.

EXAMPLE 6

1-m-trifluoromethylphenyl-2-cyanomethylamino propane

To 18 parts of crude ketimine obtained by the process described in example 5, and 80 parts of benzene were added under stirring 22 parts of NaH$_2$ [Al(O—CH$_2$—CH$_2$—O CH$_3$)$_2$] in 60 parts of benzene. The reaction mixture was gently heated for 1 hour, cooled and decomposed with a double volume of 25 percent NaOH. The organic layer was separated and the aqueous phase was extracted with ether. The combined organic fractions after drying over SO$_4$Mg were saturated with dry hydrogen chloride and the salt formed was filtered and dried. There were obtained 8 parts of hydrochloride M.P. 148°–151° C.

EXAMPLE 7

1-m-trifluoromethylphenyl-2-cyanomethylamino propane 18 parts of crude ketimine obtained by the process described in example 5 were dissolved in 100 parts of ethanol and hydrogenated under normal conditions in the presence of platinum as catalyst. After uptake of the theoretical amount of hydrogen, the reaction was discontinued and the reaction mixture filtered to remove the catalyst. The filtrate was concentrated in vacuo and the residue was fractionally distilled. There were obtained 5 parts of 1-m-trifluoromethylphenyl-2-cyanomethylamino propane.

The derivatives of examples 1a, 1b, 2, 3, and 4 were also prepared according to the processes described in examples 5, 6, and 7.

We claim:

1. A compound selected from the group consisting of:

A. amino propane compounds of the general formula

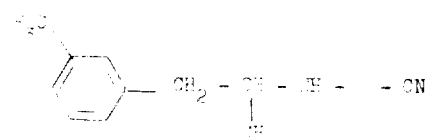

wherein A is selected from the group consisting of: —CH$_2$—, —CH$_2$—CH$_2$—,

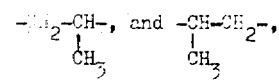

in racemic and optically active forms; and

B. physiologically tolerable acid addition salts thereof.

2. A compound of claim 1 which is 1-m-trifluoromethylphenyl-2-cyanomethylamino propane.

3. A compound of claim 1 which is 1-m-trifluoromethylphenyl-2-β-cyanoethylamino propane.

4. A compound of claim 1 which is 1-m-trifluoromethylphenyl-2-β-cyanopropylamino propane.

5. A compound of claim 1 which is 1-m-trifluoromethylphenyl-2-(1-cyano-2-propyl amino) propane.

* * * * *